United States Patent Office 3,456,839
Patented July 22, 1969

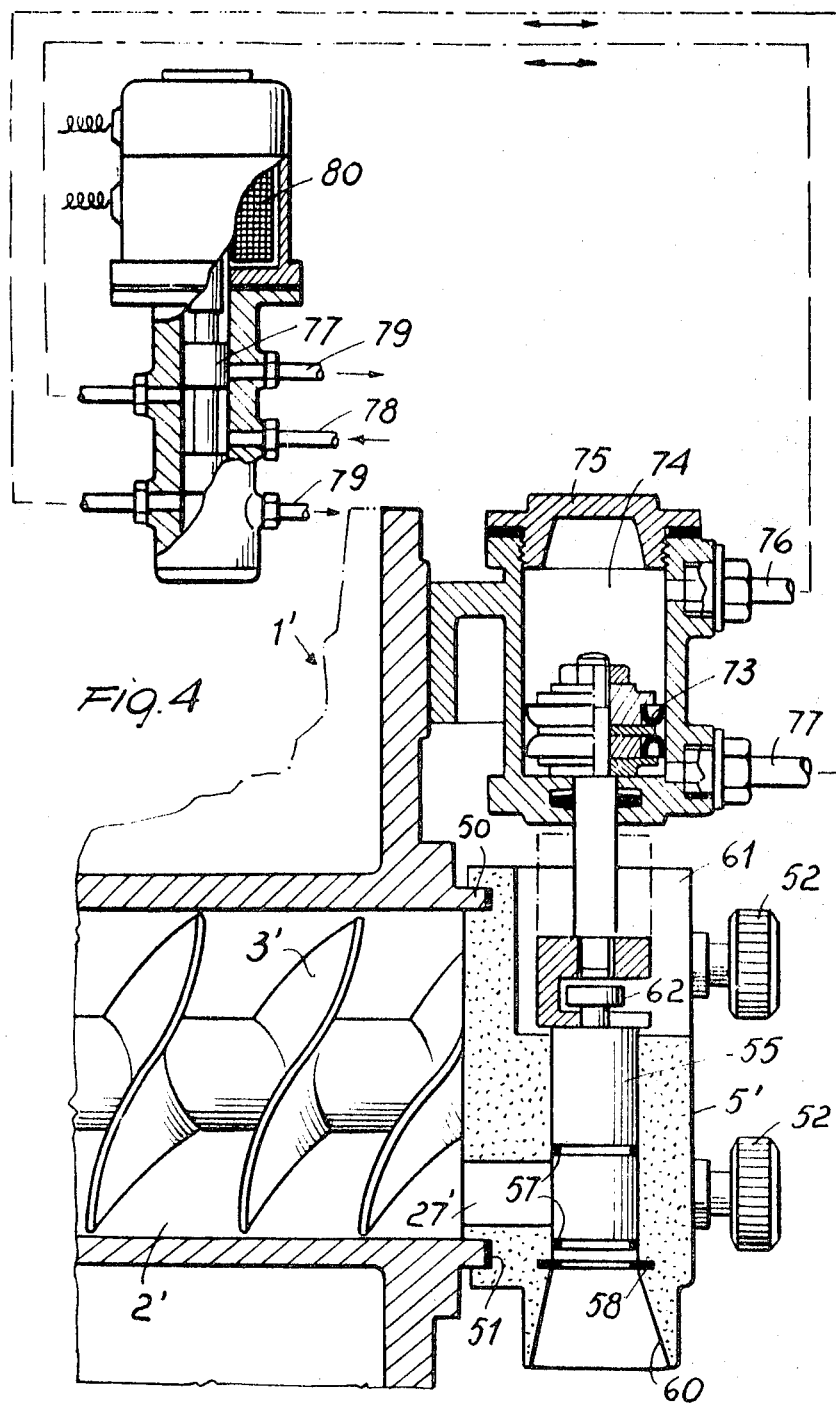

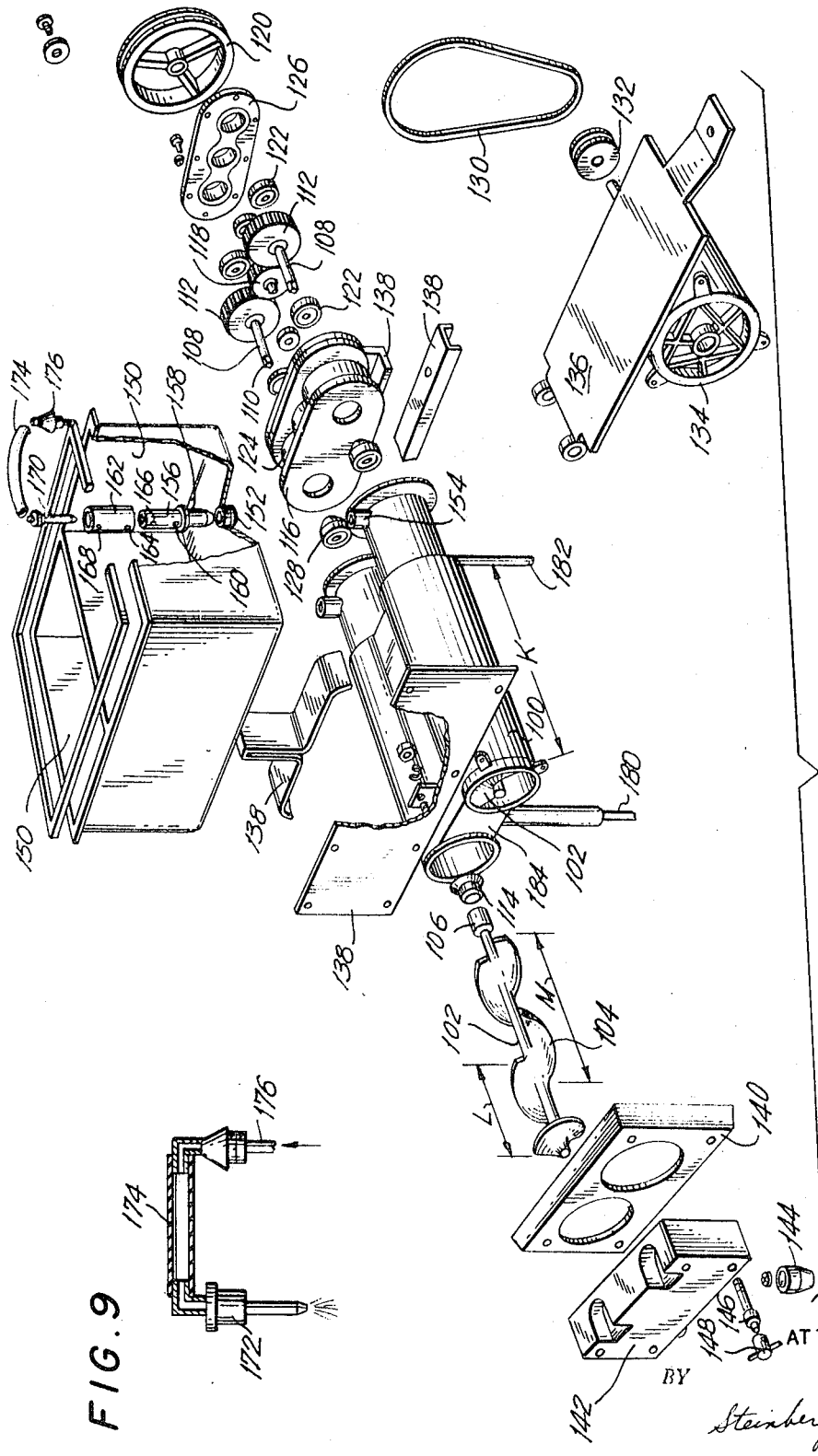

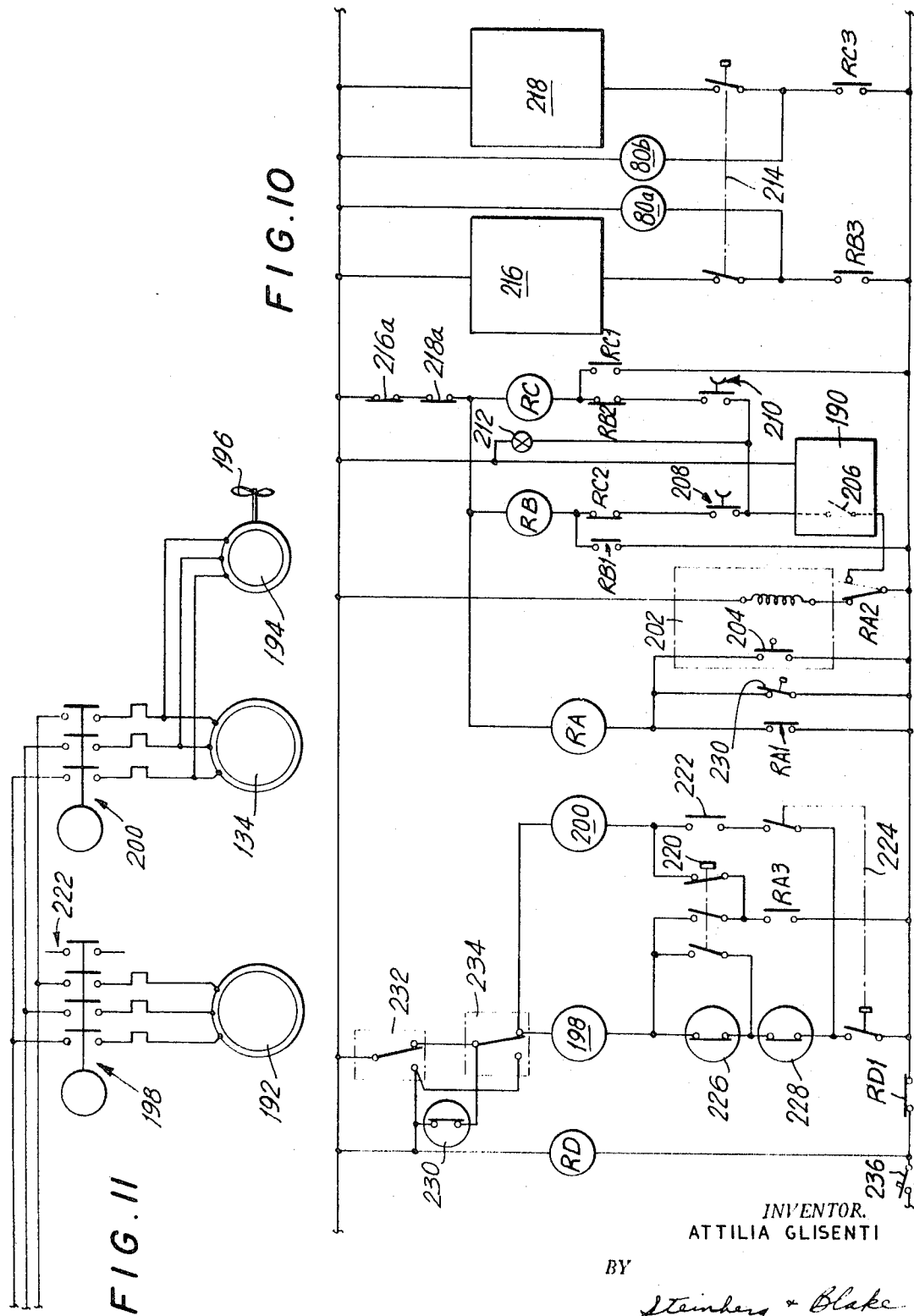

3,456,839
DISPENSER FOR CHILLED EDIBLE PRODUCTS
Attilia Glisenti, via Legionari Di Polonia 25,
Bergamo, Italy
Filed Mar. 14, 1968, Ser. No. 718,297
Int. Cl. B67d 5/08, 5/62; G04c 23/38
U.S. Cl. 222—70  20 Claims

ABSTRACT OF THE DISCLOSURE

A dispenser for dispensing a chilled, edible product which is in an at least partially solidified condition, this product being, for example, ice cream, sherbet, or the like. The dispenser includes a reservoir in which the product is initially in a liquid condition, and a refrigerated cylinder means communicates with the reservoir to receive the liquid product therefrom. Situated within the cylinder means is a rotary auger means for agitating the liquid product to convert it into the at least partially solid condition, and a discharge nozzle means communicates with the cylinder means for discharging the product therefrom. A valve means is interposed between the nozzle means and cylinder means for controlling the flow of the product therethrough, and an electrically-operable valve-control means is provided to control the valve means for opening and closing the nozzle means. An auger drive means is operatively connected to the auger means for driving the latter, and a manually operable means coacts with the auger drive means and with the valve control means for setting the drive means into operation to rotate the auger means and for actuating the valve means to displace it to an open position. A time-delay means is provided for delaying the actuation of the valve means for a given period of time after the auger means has operated in response to actuation of the manually operable means, so that it is not possible for any product to issue from the nozzle means until after the auger means has been driven for a given time period.

Background of the invention

The present invention relates to dispensers.

In particular, the present invention relates to apparatus for dispensing an edible product in a chilled condition where the product is at least partially solidified. Thus, the dispensed product may be ice cream, sherbet, or the like.

Conventional apparatus for dispensing such products are exceedingly complex and expensive and are not capable of reliably providing predetermined amounts of the product in the desired condition at all times. When considerable demand is made on the conventional apparatus it cannot produce the chilled product in the required condition where it is at least partially semi-solid, and a product which is too liquid will be delivered from the conventional apparatus. Furthermore, it is difficult to achieve from the conventional apparatus a product which is in a suitably light and fluffy condition, and instead the product is dispensed in a condition where it is too heavy and dense. Moreover, when the known structures are designed to provide a selection among a number of different flavors, this selection can only be achieved with exceedingly complicated structure which has frequent breakdowns. The conventional apparatus converts the product from an initially liquid, condition into the at least partially solid condition, and there is a tendency with conventional apparatus for the product which is at least partially solid to back up into the liquid, a problem which up to the present time has not been satisfactorily solved. Also, particular difficulties are encountered with the conventional apparatus when it is desired to perform operations such as defrosting and cleaning of the apparatus.

Summary of the invention

It is accordingly a primary object of the present invention to provide a dispenser of the above general type which will avoid all of the above drawbacks.

In particular, it is an object of the invention to provide an apparatus of the above general type which will reliably operate at all times to issue the product only in the proper condition, irrespective of the frequency with which demands are made on the apparatus for issue of the product therefrom.

It is furthermore an object of the present invention to provide an apparatus which while being of a relatively simple rugged construction which operates very reliably nevertheless is capable of providing a selection from among a plurality of different flavors.

Also, it is an object of the invention to provide an apparatus of the above type which can deliver the product in a relatively light, fluffy condition which is not undesirably dense.

Also, it is an object of the invention to provide a construction which will reliably prevent backup of the product which is at least in a partially solidified condition into the liquid product.

Furthermore, it is an object of the invention to provide a reliably operating structure capable of being actuated to perform in a very efficient manner such operations as defrosting and cleaning.

The apparatus of the invention includes a reservoir in which the product is initially located in a liquid condition. A refrigerated cylinder means communicates with the reservoir to receive the liquid product therefrom, and a rotary auger means is situated within the cylinder means to agitate the liquid product received from the reservoir so as to convert this product into its at least partially solid condition. A discharge nozzle means communicates with the cylinder means to discharge the product therefrom in the at least partially solidified condition, and a valve means coacts with this nozzle means to open and close the latter. An electrically-operable valve-control means coacts with the valve means for displacing the latter between open and closed positions, and an electrically operable auger-drive means coacts with the auger means for rotating the latter. A manually operable means is operatively connected with the auger-drive means and with the valve-control means for actuating both of the latter means, and according to a particular feature of the invention a time-delay means coacts with the valve-control means for preventing the latter from displacing the valve means from its closed to its open position until after the auger means has been driven by the auger-drive means for a given period of time.

Brief description of drawings

The invention is illustrated by way of example in the accompanying drawings which form part of this application and in which:

FIG. 4 is a fragmentary partly sectional schematic illustration of the structure for controlling the issue of the product from the dispensing apparatus;

FIG. 8 is an exploded perspective view showing various details of the dispensing apparatus of the invention;

FIG. 9 is a fragmentary partly sectional elevation showing an air-jet structure of the invention;

FIG. 10 is a wiring diagram illustrating how the dispensing apparatus of the invention functions and is controlled; and FIG. 11 is a further wiring diagram illustrating the units which are controlled by the structure of FIG. 10.

Description of preferred embodiments

Figures 1, 2:
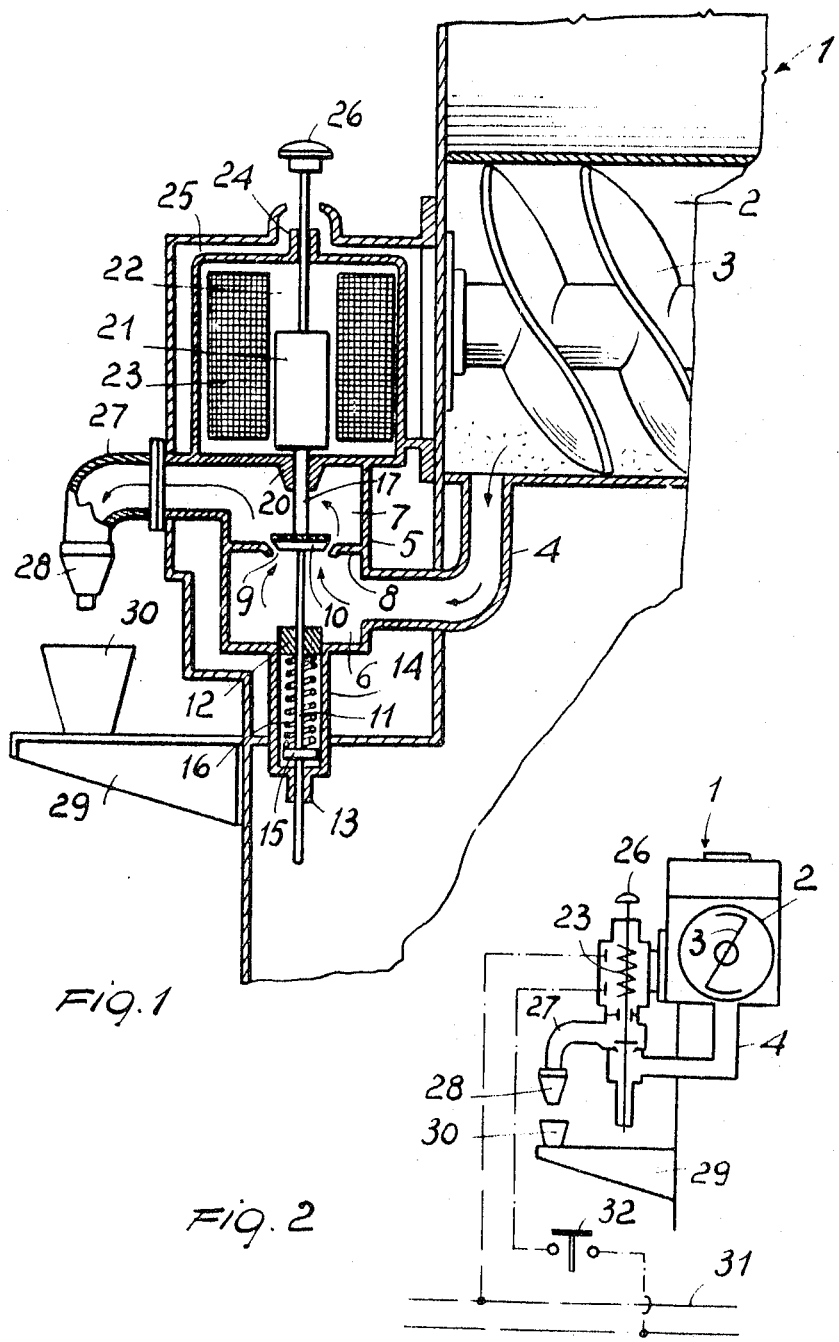
FIG. 1 is a schematic partly sectional fragmentary elevation showing one embodiment of the structure of the invention at the part thereof where the product issues from the apparatus.
FIG. 2 is a schematic representation of the structure of FIG. 1 and the controls therefor.

Referring now to FIG. 1, there is shown therein a dispensing apparatus 1 of the invention provided with a refrigerated cylinder means 2 in which the product is agitated so as to be placed in an at least partially solidified condition. This agitation is brought about within the refrigerated cylinder means 2 by way of a rotary auger means 3 which serves to deliver the product in its partially solidified condition to the outlet passage 4 from the region of one end of the cylinder means 2.

The passage 4 communicates with the interior of a body 5 having a lower section 6 and an upper section 7 separated from the lower section 6 by the horizontal partition 8 which is provided with a central tapered orifice 9 which acts as a seat for a valve 10 which forms a valve means for controlling the issue of the product from the cylinder means 2.

A rod 11 is fixed to and extends downwardly from the valve means 10 and is slidably guided through a bore of a plug 12 fixedly mounted within the body 5 at the top end of an elongated hollow cylinder extension 14 thereof. This extension 14 terminates at its bottom end in a sleeve 13 through which the rod 11 is guided, and within the extension 14 the rod 11 fixedly carries a disc 15 acted upon by the lower end of a compressed coil spring 16 which surrounds the rod 11 and presses at its top end against the plug 12. Thus, the spring 16 urges the valve means 10 to its closed position.

A rod 17 is fixed to and extends upwardly from the valve 10 and is coaxial with the rod 11, and this rod 17 extends slidably through a bore of a projection 20 of the body 5. The rod 17 is fixed with the armature 21 of an electromagnet which includes the coil 23 which defines the hollow space 22 in which the armature 21 is accommodated for axial movement. The upper end portion of the rod 17 is guided through a tubular extension 24 of the housing in which the coil 23 is located, and this housing 25 is secured in any suitable way to the body 5.

At its outer top end the rod 17 is provided with knob or handle 26 enabling the valve 10 to be manually opened as when there is no electrical current available for energizing the coil 23.

The body 5 is provided above the partition 8 with a passage communicating with the chamber 7 and with an outlet duct 27 which terminates in the discharge nozzle means 28.

FIG. 1 illustrates a cup 30 which is to receive the dispensed product, this cup 30 being situated on a bracket 29 which supports the cup beneath the discharge nozzle means 28.

The above-described structure of FIG. 1 is schematically represented in FIG. 2 which illustrates how the electromagnet 23 is connected with a source of electrical energy 31 through a manually operable switch 32 which can be closed by the operator when it is desired to dispense product from the nozzle 28 into the cup 30.

Figures 3, 5, 6, 7:
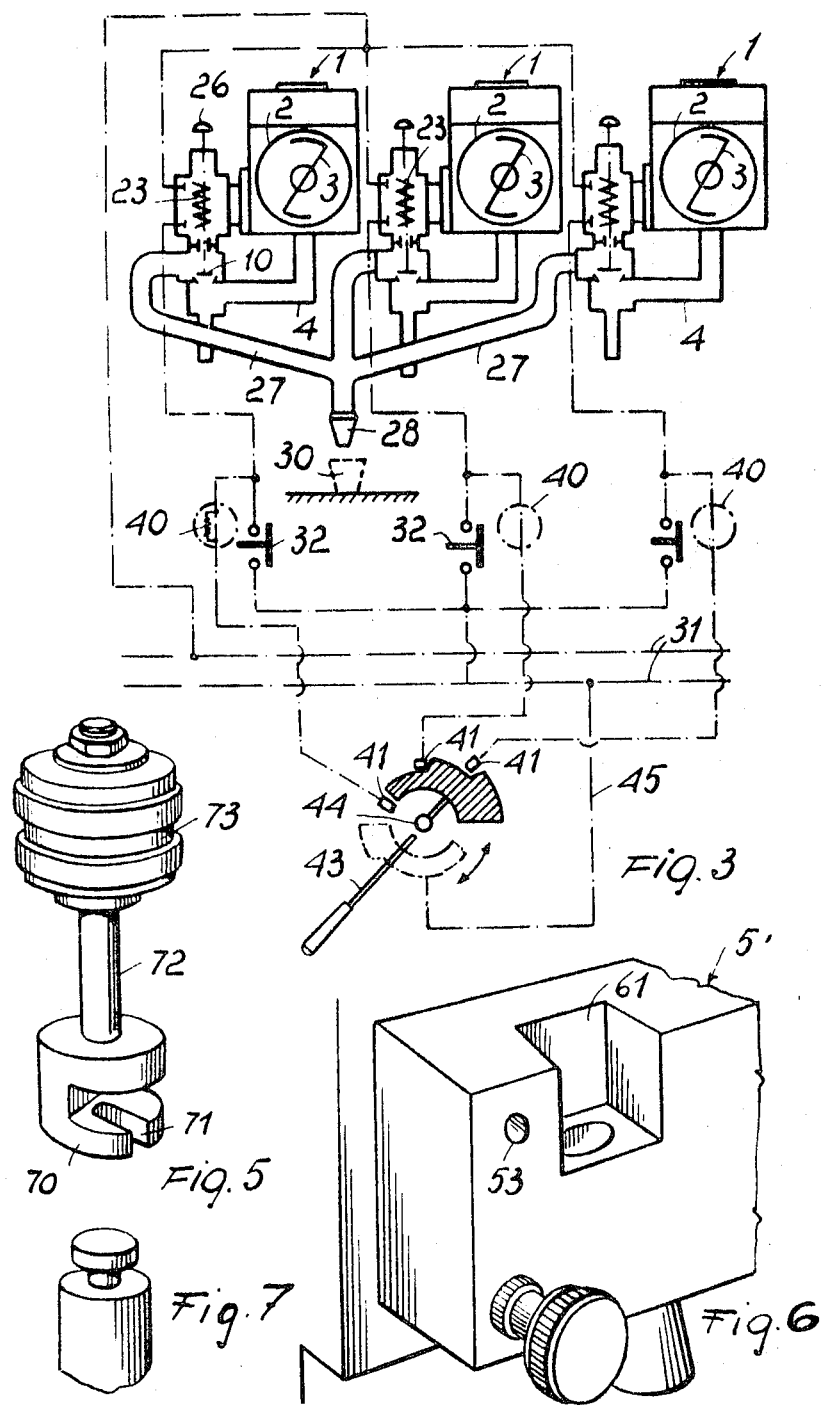
FIG. 3 is a schematic representation of an embodiment where different flavors of the product can be selected.
FIG. 5 is a perspective illustration of part of the apparatus for controlling the valve means.
FIG. 6 is a fragmentary perspective illustration of the structure through which the product issues.
FIG. 7 is a fragmentary perspective illustration of the upper end of the valve means.

Three of the assemblies shown in FIG. 2 are united together in the embodiment of FIG. 3 for respectively providing products of different flavors. In this case all of the discharge conduits 27 of the several assemblies communicate with a common discharge nozzle means 28. As is apparent from the wiring indicated in FIG. 3 it is possible to separately close the several switches 32 for separately actuating the units so as to derive a product of selected flavor from a selected unit. However, it is also possible to operate all three units simultaneously by connecting timers 40 into the several circuits of the several units, respectively. The timers 40 are respectively connected in parallel with the switches 32 for bypassing the latter, and through these timers the electromagnets 23 are maintained energized for a preselected period of time. The three timers are respectively connected electrically with three stationary contacts 41 while a rotary sector 42 which is made of an electrically conductive material is carried by a rotary arm 43 supported for rotary movement on a pin 44 and capable of shifting the sector 42 from the dot-dash line position thereof shown in FIG. 3, where it is displaced from the stationary contacts 41, to the solid-line position where it is shown engaging the several contacts 41. It will be noted the selectively conductive sector 42 is electrically connected to a source of electrical energy 31 through a conductor 45.

Thus, when the handle 43 is actuated to place the sector 42 into engagement with the three contacts 41, the three timers will be simultaneously actuated for the preselected period during which the three flavors are simultaneously issued through the conduit means 27 to the discharge nozzle 28. In this way the three flavors are mixed and delivered in common to the container or cup 30. At the end of the time which is determined by the timers 40 the circuits open and the delivery stops so that the operator will then return the control sector 42 back to its rest position shown in dot-dash lines in FIG. 3.

It is also possible to arrange the switches 32 so that instead of directly closing the circuits they can act on the timers 40 so as to maintain the circuits energized only for a preselected duration during which the electromagnets are energized to control the amount of product which is delivered.

In the embodiment which is illustrated in FIGS. 4–7 those components which are equivalent or similar to those described above are indicated by the same reference characters primed. Thus, referring to FIGS. 4–7 it will be seen that the dispensing apparatus 1' is provided with the refrigerated cylinder means 2' provided in its interior with the rotary auger means 3'. It is to be noted in connection with FIG. 4 that the rotary auger means 3' has a screw portion carried by a shaft which is of a substantial diameter so that in this way the product is maintained at a substantial distance from the axis of the refrigerated cylinder means 2'. In this way the product cannot at any time be too distant from the refrigerated wall of the cylinder means 2' and thus a highly efficient chilling of the product is achieved through the substantial diameter of the shaft of the rotary auger means 3'.

The cylinder means 2' terminates at its front end in an annular portion 50 which is received in a groove of a molded plastic body 5' which may be injection molded and which is provided in its groove which receives the portion 50 with a suitable sealing ring 51. A plurality of manually turntable screws 52 extend through openings of the plastic body 5' into threaded openings of the wall of the apparatus 1' for releasably fixing the body 5' to the cylinder means in the position illustrated in FIG. 4.

The plastic body 5' is formed with the passage 27' which provides communication between the interior of the cylinder means 2' and a vertical bore of the body 5' which terminates at its bottom end in the discharge nozzle means 60. A valve means 55 is slidable in this vertical bore and is provided with a pair of sealing rings 57 so that when the valve means 55 is in the illustrated closed position, shown in FIG. 4, the product cannot flow from the passage 27' into the discharge nozzle means 60. The downward stroke of the valve means 55 is limited by a snap ring 58 carried in a groove of the body 5'.

Just above the vertical bore which receives the valve means 55 the body 5' is formed with a recess 61 receiving the top head end 62 of the valve means 55, this head end 62 having just above the valve 55 a portion of reduced diameter to form part of a fork-linkage means. A stirrup member 70 has a lower portion formed with a notch 71 and adapted to slip beneath the head 62 with the portion of reduced diameter received in the notch 71, as indicated in FIG. 4 and as is apparent from FIGS. 5 and 7. In this way there is a fork-linkage means for connecting the valve means 55 with the structure for actuating the latter.

The stirrup member 70 is fixed to the bottom end of a rod 72 whose top end is fixed to a pneumatically-actuated piston 73. This piston 73 is slidable within an air cylinder 74 fixed in any suitable way to the apparatus just above the body 5'. The cylinder 74 is closed by a plug 75. A pair of air ducts 76 and 77 respectively communicate with the upper and lower ends of the cylinder 74, and the parts 73, 74 form a double-acting motor means for displacing the valve means 55 between its open and closed positions. The flow of air through the ducts 76 and 77 is controlled by way of a slide valve means 77' having ducts 79 which communicate with the outer atmosphere and an inlet duct 78 through which compressed air is delivered from any suitable source. A solenoid 80 is operatively connected with the slide valve 77' for actuating the latter, and in this way an electrically operable valve-control means is provided for controlling the valve means 55 so as to displace the latter between its closed and open positions. In the position of the parts shown in FIG. 4 the air under pressure which enters through the duct 78 can flow through the slide valve 77' along the duct 76 to the top end of the cylinder 74 to maintain the valve 55 in its closed position, and it will be noted that at this time the duct 77 communicates with the outer atmosphere through the lower duct 79 of FIG. 4. On the other hand, when the solenoid 80 is energized to raise the slide valve 77', the air under pressure will be delivered through the duct 77 beneath the piston 73 to raise the latter while at this time the duct 76 will communicate with the outer atmosphere through the upper outlet 79, and thus the double-acting movement for the valve 55 is achieved.

Although it is possible to control the solenoid 80 with a simple push-button switch and also with a suitable timer, it is preferred to control the solenoid 80 in accordance with the invention in the manner described below in connection with FIG. 10. Of course, when the solenoid 80 is energized the valve 55 will be displaced upwardly to its open position permitting the product to be discharged, and after a given time the valve will be returned to its closed position. Of course, the above described structure of FIGS. 4-7 has the advantage of permitting a very quick and easy replacement of the body 5' and the valve means 55. Moreover, the fragmentary illustration of the body 5' in FIG. 6 is intended to show that a second and even a third assembly of the type shown in FIG. 4 may be provided so as to achieve an operation similar to that described above in connection with FIG. 3.

Referring now to FIG. 8, there is shown therein an embodiment of the apparatus which corresponds generally to that of FIGS. 4-7 and in which there are a pair of refrigerated cylinder means and structure associated therewith to provide for selection of one of two different flavors. The two units of this embodiment are substantially identical so that description of details of one unit will also apply to the other.

Each unit has a refrigerated cylinder means 100 within which a rotary auger means 102 rotates to agitate the product and convert it into its at least partially solidified condition. It is to be noted that the screw 104 has a front portion L which is of a pitch substantially smaller than the remainder M of the screw. The pitch of the portion L of the screw 104 of the rotary auger means 102 is such as to provide an efficient feeding of the product out of the cylinder means 100, while the elongated remainder portion M of substantially longer pitch will act primarily to agitate the product without pushing the latter forwardly out of the cylinder means with any substantial force. These portions L and M of different pitch overlap each other to a small extent.

The shaft of the rotary auger means 102 is provided at its rear end with a portion 106 formed with a bore of square cross section to receive the free end of a drive shaft 108 which is provided with an end 110 of a square cross section matching that of the bore of the rear portion 106 of the rotary auger means. This drive shaft 108 is fixed at its rear end to a gear 112.

A circular sealing sleeve 114 made of a flexible plastic which may be resilient is pressed onto the rear portion 106 surrounding the latter, and this sleeve 114 terminates at its rear edge in an outwardly directed flexible lip which is pressed by the material within the refrigerated cylinder means 100 against the rear closure wall 116 of the cylinder means 100. Thus, the element 114 forms a sealing means which prevents the product from having access to the drive shaft 108. Of course, the above-described structure for the left cylinder 100 of FIG. 8 is identical with that provided for the right cylinder 100, and the rear closure wall 116 is common to both of these cylinders.

The gears 112 form a part of an auger-drive means which includes an intermediate gear 118 meshing with both of the gears 112 and fixed to a shaft on which a pulley 120 is fixed. The gears 112 and 118 together with the shafts 108 and suitable bearings 122 are all situated within a housing 124 which extends from the cylinder closure wall 116 and which is itself closed by a wall 126 through and beyond which extends the shaft which carries the pulley 120. Bearings 128 which function similarly to bronze bearings are threaded into the wall 116 to receive to the rear of sealing members 114 portions 106 of the auger shafts to support the latter for rotary movement at their rear ends where they are connected to the shafts 108 for rotary movement therewith.

The pulley 120 is connected by way of a belt 130 to a pulley 132 driven by an electric motor 134. This motor is mounted on any suitable support structure 136 and additional supports 138 for the various components are indicated. A front wall portion 140 of the apparatus is shown provided with openings which are respectively aligned with the cylinders 100, and to this front wall portion 140 is fixed a plastic body 142 corresponding to the body 5' described above and provided with a pair of discharge nozzles and passages respectively communicating with the pair of cylinder means 100 in the manner described above. One of the discharge nozzles 144 is indicated in FIG. 8 as well as one of the screws 146 which in the illustrated example can be turned by a suitable wrench 148.

Situated above the pair of refrigerated cylinder means 100 are a pair of reservoirs 150 which receive the product initially in a liquid condition. These reservoirs 150 will have liquids of different flavors. The bottom wall of each reservoir 150 is provided with an outlet sleeve 152 communicating fluid-tightly with an inlet 154 at the rear end of each refrigerated cylinder means 100. A sleeve 156 which is open at both of its ends and which is provided with suitable sealing glands 158 extends into the aligned tubular components 152 and 154, and this sleeve is provided with a lower opening 160 through which the liquid must flow in order to travel downwardly along the interior of the sleeve 158 into the cylinder means 100. The sleeve 156 is surrounded by the an outer sleeve 162 which is telescoped on and is slidable around the sleeve 156. This outer sleeve 162 has an opening 164 which registers with the opening 160 to provide for the greatest rate of flow of liquid from the reservoir 150 into the cylinder means 100. Thus, by turning the sleeve 162 on the sleeve 156 it is possible to control the extent to which opening 164 overlaps the opening 160 and thus control the rate of flow of liquid into the lower cylinder means. The inner sleeve 156 is provided with an upper opening 166 situated vertically over the opening 160 while the outer sleeve 162 is provided with an upper opening 168 situated directly over the lower opening 164. These openings 166 and 168 are identical with the openings 160 and 164, respectively, and have the same angular positions as the latter openings. Furthermore, the openings 166 and 168 are situated at all times above the liquid in the reservoir 150, so that the operator by looking at the openings 160 and 168 can determine the adjustment of the openings 160 and 164 and can turn the sleeve 162 on the sleeve 156 to change the adjustment of this valve means.

An air-jet means 170 extends with clearance downwardly through the sleeve 156 somewhat below or up to the opening 160 thereof so as to be situated in the path of flow of liquid from the reservoir 150 into the refrigerated cylinder means 100. This air-jet means 170 is in the form of a tube having a lower nozzle outlet through which a jet of air is adapted to issue, and it is provided at its top end with a suitable fitting 172 by which it rests on top of the outer sleeve 162. The air-jet tube 170 communicates at its top end with a flexible conduit 174 (FIG. 9) which in turn communicates with a source of compressed air 176. In this way a jet of air will be delivered into the liquid as it flows downwardly into the refrigerated cylinder means to aerate the liquid and to provide a light, fluffy product which is not too dense. Some of the air from the nozzle jet 170 will issue through the openings 160 and 164 so as to maintain the liquid in the reservoir 150 in an agitated condition which contributes to the efficiency of the manufacture of the product, and furthermore the jet of air will prevent any clogging in the path of flow of the liquid from the reservoir into the cylinder means.

In order to prevent the product which is in a condition which is at least partially solidified from backing up through the connections 152 and 154 into the liquid, the pair of cylinders 100 are surrounded by refrigerating coils over the axial distance K for each cylinder 100. The refrigerant flows through each coil which surrounds a cylinder by way of an inlet 180, the refrigerating medium being discharged from the coil through an outlet 182. The pair of refrigerating coils which thus surround the pair of cylinders 100 along the axial distance K are immersed in a body 184 containing a material such as lead and acting as a thermal reservoir. This material which encloses and unites the pair of cylinder means with each other is known in the field of the invention. Part of the conduit for the refrigerant is not coiled but instead extends along the cylinders without engaging the latter, and this non-coiled length of conduit is situated in the heat reservoir means 184 and has a length sufficiently great to absorb in this zone sufficient heat which even under the most unfavorable operating conditions will always maintain the mixture sufficiently liquid to prevent backup of the partly solidified material into the liquid reservoir.

The flow of the liquid from the reservoir into the refrigerated cylinder means takes place by gravity while being aided by the air-jet means 170 which avoids stoppages, as pointed out above.

The manner in which the apparatus of the invention is controlled and functions is apparent from FIGS. 10 and 11. In the illustrated example there is a manually operable means for starting a cycle of operations, and this manually operable means is coin-operated, although it can be operated in any other manner, if desired, as for example, simple by a manually operable switch. One of the most important features of the invention is the presence of a time delay means 190 schematically illustrated in FIG. 10 and serving to prevent opening of the valve means after a coin has been introduced into the machine until after the rotary auger means has been driven for a length of time sufficiently great to assure dispensing of products in a proper condition. Thus, even if there are times when the demand on the apparatus is very great so that the frequency with which coins are introduced into the machine is very high, nevertheless the structure of the invention will operate automatically to prevent issue of the product after each coin is inserted for a length of time sufficiently great to guarantee that the rotary auger means will have had sufficient opportunity to place the product in its proper condition before it can be discharged. The time delay means 190 thus assures an operation where at least that amount of product which is to be dispensed at each cycle is in the best possible condition before it will be dispensed.

As may be seen from FIG. 11, the apparatus includes three motors, namely the three-phase motor 192 for operating the compressor of the refrigerating circuit, the motor 134 referred to above and serving to drive the rotary auger means, and a third three-phase motor 194 which operates the fan 196 which cools the condenser of the refrigerating circuit. The motor 192 is connected to a source of electricity through a switch means 198, while the motor 134 is connected to the source of energy through a switch means 200. The motor 194 is connected in parallel with the motor 134 and in addition to operating a cooling fan 196 serves through an unillustrated belt transmission to operate one or more air compressors which supply the compressed air to the air-jet means 170 as well as to the supply conduit 78 of the slide valve 77' which is actuated by the solenoid 80 as described above in connection with FIG. 4.

The unit 202 which is schematically illustrated in FIG. 10 is designed to receive a coin which will close the switch 204. The closing of the switch 204 will serve to energize a relay RA, and when the relay RA is energized it will close the normally open switch RA1, it will turn the switch RA2 from the solid to the dot-dash line position shown in FIG. 10, and it will also close the normally open switch RA3. The switch RA2 is shown in a normal position where a coil of the coin-receiving unit 202 is energized so that this unit is in readiness to receive a coin which will then drop into a suitable receptacle upon closing of the switch 204 in a well known manner, the details of the manually operable means 202 forming no part of the invention. The closing of the switch RA1 will of course serve to maintain the relay RA energized even after the coin has moved beyond the switch 204 so that the latter opens.

The movement of the switch RA2 from the solid to the dot-dash line position serves to connect the time-delay means 190 of the invention into the circuit. However, this time-delay means 190 includes a switch 206 which will not close until expiration of the delay period for which the time-delay 190 is set. Thus, the circuit through the switch RA2 when the latter is in its dot-dash line position is open until the time-delay 190 closes this circuit by way of the switch 206. This latter circuit includes a pair of push-button-type of selecting switches 208 and 210 for respectively selecting the flavor of the product which is to be dispensed, but until the switch 206 is closed by the timer 190 closing of the switch 208 or 210 will have no effect and the valve means such as the valve 55 of FIG. 4 will not be displaced to its open position. The time-delay 190 may be set to close the switch 206 after a predetermined period of twelve or more seconds, for example, subsequent to insertion of a coin into the apparatus. Once the switch 206 is closed by the timer, a lamp 212 will be illuminated so as to indicate to the operator that he may now actuate either the switch 208 or the switch 210 according to the desired flavor. If, for example, the switch 208 is selected, then the relay RB will be energized so as to close the normally open switch RB1 and thus maintain the relay RB energized. At the same time the normally closed switch RB2 will be opened. This latter switch is located in the circuit which has the selecting button 210 which when depressed after illumination of the lamp 212 will result in energizing of the relay RC. This will result in closing of the switch RC1 and opening of the switch RC2. The opening of the switch RB2 when the relay RB is energized will prevent energizing of the relay RC if the operator should decide to press the button 210 as well as the button 208, while the opening of the switch RC2 will prevent energizing of the relay RB if the operator should decide to close the switch 208 after having selected the switch 210.

The energizing of the relay RB will also serve to close the normally open switch RB3 which will thus energize the solenoid 80a corresponding to the solenoid 80 of FIG. 4 and serving to open the valve means of one of the refrigerated cylinder means. If it is the relay RC which is energized, then the normally open switch RC3 will be closed and the other solenoid 80b which corresponds to the solenoid 80 will be energized to cause the product to be dispensed from the other cylinder means.

Assuming that the switch 214 is closed, then the closing of the switch RB3 will serve to set into operation a timer 216 while if the switch RC3 is closed a timer 218 will be set into operation. These timers determine how long the solenoids 80a or 80b, respectively, remain energized so as to determine the amount of product which will issue into the cup. Each of the timers 216 and 218 may be set to maintain the solenoid energized for a period on the order of two seconds, for example. Within this short period of time there will be dispensed from the machine an amount of the product which corresponds to the value of the coin which has been introduced. When the time for which the timer 216 has been set expires, then it will momentarily open a switch 216a which will return the circuit to its initial rest position, while if it is the timer 218 which has been energized then when the time for which the latter has been set expires a switch 218a will be momentarily opened so as to also return the circuit to its rest position ready for the next cycle.

As has already been pointed out above the introduction of the coin will serve to energize the relay RA so as to close the normally open switch RA3. This switch is connected into the circuit of a manually operable switch 220 which is assumed at this time to be displaced to a position where the left pair of contacts are closed and the right one is open. As a result the switch 198 is energized and thus the drive means 192 for the refrigerator compressor is started. Thus, the refrigeration of the cylinders necessarily takes place just prior to and during actuation of a button 208 or 210.

The closing of the switch 198 will serve to close a switch 222 which is connected into the circuit of the switch 200, and assuming that at this time a manually operable switch 224 is closed, then it is clear that the switch 200 will be closed in response to closing of the switch 198 so as to energize the drives 134 and 194. Thus, during the period of delay determined by the timer 190 the rotary auger means is necessarily driven and the refrigeration of the cylinders takes place so that by the time the switch 206 is closed to enable a valve means 55 to be opened, the product will necessarily be in a proper condition to be dispensed into a receptacle such as the cup 30. In this way no matter how frequently coins are introduced there will always be this predetermined delay provided by the timer 190 so as to guarantee that the product which is dispensed is always a peak condition.

The circuit includes thermostats 226 and 228. The thermostat 228 controls the flow of current to the switch 198 and it will open when the temperature in a cylinder falls below a predetermined value which may be, for example, below $-15°$ C. Thus, when the refrigerating means has cooled the product to a temperature below this latter temperature, the switch 198 will necessarily open so as to interrupt the refrigeration.

The thermostat 226 will respond when the temperature rises, for example, to a value on the order of $-5°$ C. This thermostat 226 is rendered operative at those intervals when there is very little if any demand for product. Thus, the thermostat 226 will operate through the night when an establishment provided with the apparatus of the invention is closed and when it is desired to avoid too great a consumption of electrical current. During such periods, as for example, during the night, the switch 224 is closed and the switch 220 is situated in the position illustrated in FIG. 10 so that the thermostat 226 is connected in series with the thermostat 228, so that assuming that the thermostat 226 will necessarily open before the thermostat 228, the latter remains excluded from participating in the operation of the circuit.

In order to bring about defrosting, the switch 224 is displaced to its illustrated open position and the operator will momentarily close a manually operable switch 230. The switch 220 is at this time in the position shown in FIG. 10 so that in this way the relay RA will cause the switch RA3 to close and complete the circuit through the switch 200 but not through the switch 198. Thus, for one cycle of operation the apparatus will operate without driving of the compressor of the refrigerating structure and thus defrosting can be carried out.

When the switch 214 is in its open position the apparatus can be cleaned. The result of opening the switch 214 will render the timers 216 and 218 inactive. Therefore, at this time the operation will continue beyond the time determined by the timers 216 and 218 and there will be a continuous issue of the product so as to empty the apparatus which may then be conveniently cleaned. In other words once the rotary augers are started they will continue to rotate and the product will continuously issue without requiring introduction of a number of coins.

The unit 230 is a pressure-responsive switch which will actuate the relay 232 or 234 which are thermal relays for protecting the motors 192 and 134. This pressure-responsive switch 230 is inserted into the refrigerating circuit so as to respond when the refrigerating fluid reaches a dangerously high pressure. In this case the unit 230 will energize the relay RD, resulting in opening of the normally closed switch RD1, and thus the entire circuit will be opened. Situated to the left of the switch RD1 is a master switch 236 for the entire apparatus. It is to be noted that if the thermal protection relay 232 of the drive 192 responds so that its switch swings to the left, as viewed in FIG. 10, then the same relay RD will be energized so that if the temperature of the drive 192 becomes too high this circuit will also be opened. The same operations take place through way of the thermal control relay 234 of the drive 134 so as to protect the latter against temperatures which are too high. In the event that something goes wrong so that the temperature of the motor 134 rises too high, then the switch of the thermostatic protective device 234 will move to the left so as also to act to energize the relay RD and thus open the circuit.

An additional unillustrated pressure-responsive safety member is inserted into the pneumatic circuit to sense when the pressure of the compressed air rises too high, and this latter protective device will prevent the switch 200 from closing in the event that the pressure becomes too high.

Thus, the apparatus of the invention is provided with suitable safety devices.

It will be seen that with the structure of the invention it becomes possible to provide in a relatively simple way a guaranteed dispensing of product in peak condition under all conditions of operation while also having the possibility of defrosting and cleaning the apparatus in an exceedingly convenient manner.

What is claimed is:

1. In an apparatus for dispensing an edible, chilled product in at least partially solidified condition, a reservoir for containing the product initially in a liquid condition, refrigerated cylinder means communicating with said reservoir for receiving the liquid product therefrom, rotary auger means in said cylinder means for agitating the liquid product received from said reservoir and converting the product into said condition where it is at least partially solid, discharge nozzle means communicating with said cylinder means for discharging the product therefrom in the chilled, at least partially solid condition, valve means interposed between said discharge nozzle means and said cylinder means for closing said nozzle means to prevent discharge of product therefrom when said valve means is in a closed position and for opening said nozzle means to free the latter for discharge of the product from said cylinder means when said valve means is in an open position, electrically-operable valve control means coacting with said valve means for controlling displacement thereof between said open and closed positions, electrically-operable auger-drive means operatively connected with said auger means for rotating the latter, manually-operable means coacting with said auger drive means and with said valve control means for actuating said auger drive means to rotate said auger means and for actuating said valve-control means for displacing said valve means from its closed to its open position, and time-delay means interposed between said manually operable means and said valve-control means for preventing the latter from displacing said valve means from its closed to its open position until after said auger means has been driven for a given period of time by said auger drive means.

2. The combination of claim 1 and wherein said electrically operable valve control means includes a pneumatic moving means operatively connected with said valve means for displacing the latter between its positions, a slide valve coacting with said pneumatic means for controlling the direction of movement thereof for controlling displacement of said valve means between its positions, and solenoid means coacting with said slide valve to control the position thereof for controlling said pneumatic means to displace said valve means between its positions.

3. The combination of claim 2 and wherein a fork-link means removably interconnects said pneumatic means with said valve means.

4. The combination of claim 3 and wherein a plastic body is carried by one end of said cylinder means and is formed with an opening constituting said nozzle means and with a passage extending between said cylinder means and said nozzle means, said valve means being interposed in said passage between said nozzle and cylinder means when said valve means is in its closed position.

5. The combination of claim 1 and wherein there are a plurality of said reservoirs, refrigerated cylinder means communicating therewith, rotary auger means within said cylinder means, and valve means and nozzle means respectively communicating therewith, a plurality of said electrically-operable valve control means respectively coacting with said plurality of valve means, and said manually operable means including selecting means for manually selecting which of said valve means will be opened to discharge a product from a selected cylinder means.

6. The combination of claim 5 and wherein said auger drive means is common to all of said auger means.

7. The combination of claim 1 and wherein a second timer means coacts with said valve control means for actuating the latter to displace said valve means to its closed position after said valve means has been in its open position for a given time period.

8. The combination of claim 7 and wherein a manually operable means coacts with said second timer means for bypassing the latter to provide for continuous feeding of the product from said cylinder means to empty the latter for cleaning purposes.

9. The combination of claim 1 and wherein an electrically operable compressor drive means coacts with said refrigerated cylinder means for controlling the refrigerating of said cylinder means, said electrically operable compressor drive means being electrically connected with said auger drive means for setting the latter into operation when said compressor drive means operates and said manually operable means actuating said compressor drive means to provide through the latter actuation of said auger drive means, so that both of the latter drive means operate simultaneously.

10. The combination of claim 9 and wherein a manually operable means is provided for operating said auger drive means independently of said compressor drive means through a given operating cycle for defrosting purposes.

11. The combination of claim 1 and wherein a manually adjustable valve means is situated between said reservoir and cylinder means for controlling the rate of flow of liquid from said reservoir to said cylinder means.

12. The combination of claim 11 and wherein said manually operable valve means includes inner and outer sleeves turnable one with respect to the other and respectively formed with openings communicating with the liquid in the reservoir and with said cylinder means, said openings in one position of said sleeves with respect to each other being in full registry to provide the maximum rate of flow of liquid from said reservoir to said cylinder means and said one sleeve being turnable relative to the other for controlling the extent of overlap of said openings to control the rate of flow.

13. The combination of claim 12 and wherein said sleeves extend above the liquid in the reservoir and have visible above the liquid a pair of openings situated with respect to each other in a manner identical to said first-mentioned openings of said sleeves to provide a visual indication of the setting of said manually operable valve means.

14. The combination of claim 1 and wherein an air-jet means is situated at the region where said reservoir communicates with said cylinder means to aerate the liquid product flowing into said cylinder means and to prevent clogging of the flow of the liquid product into said cylinder means.

15. The combination of claim 14 and wherein a compressed-air supply means is operatively connected to said air-jet means to supply the latter with air under pressure, said supply means being operatively connected to said auger-drive means to be actuated whenever said auger-drive means operates, so that an air-jet is supplied simultaneously with the rotation of said auger means.

16. The combination of claim 1 and wherein said rotary auger means includes an elongated rotary shaft and a screw member extending helically around and fixed to said shaft, said shaft being rotated by said auger-drive means and said screw member having in the region of said nozzle a portion of a smaller pitch than the remainder of said screw member for urging the product out of said cylinder means with said portion of relatively small pitch while agitating the product in said cylinder means with said remainder of said screw member which is of substantially larger pitch.

17. The combination of claim 16 and wherein the portions of said screw member of different pitch partially overlap each other.

18. The combination of claim 16 and wherein a sealing means coacts with said shaft and cylinder means for preventing flow of product from said cylinder means to said auger-drive means.

19. The combination of claim 1 and wherein a means coacts with said refrigerated cylinder means for maintaining the product therein at a predetermined temperature during relatively long periods when said manually operable means is not actuated and at a reduced power consumption as compared to the power consumed when said manually operable means is more frequently actuated.

20. The combination of claim 1 and wherein a heat-reservoir means coacts with said refrigerated cylinder means for maintaining the product therein in a condition where it will not in its at least partially solidified condition back up into said reservoir.

References Cited

UNITED STATES PATENTS 2,559,032  7/1951  Tacchella _____ 222—70 X
2,746,260  5/1956  Swenson _____ 222—70 X STANLEY H. TOLLBERG, Primary Examiner U.S. Cl. X.R.

222—146